Nov. 3, 1936. E. G. BUDD 2,059,982
PNEUMATIC TIRE
Filed June 23, 1933

INVENTOR.
EDWARD G. BUDD.
BY
ATTORNEY.

Patented Nov. 3, 1936

2,059,982

UNITED STATES PATENT OFFICE 2,059,982

PNEUMATIC TIRE

Edward G. Budd, Philadelphia, Pa., assignor to Edward G. Budd Manufacturing Company, Philadelphia, Pa., a corporation of Pennsylvania Application June 23, 1933, Serial No. 677,190

4 Claims. (Cl. 295—31)

My invention relates to rail car tires of the pneumatic type, especially such tires incident to the fact that the tread portions upon the heads of steel rails have a limited area of tread contact and resultantly relatively high wear as compared with tires having larger areas of contact as commonly used upon road vehicles. Rail car tires are likewise operated upon a relatively high air pressure incident to the necessity for supporting high loads upon such relatively small tread contact areas. This too increases the wear. Yet further, rail car tires are sometimes though rarely cut into by slivers from the rail or sharp edged metal engaging them. While in common practice limit drop devices are used to prevent undue drop of the tire toward the rail in case of punctures, punctures are undesirable even though extremely infrequent.

My invention has to do with the subjugation of these troubles. It consists in the employment upon the tread of the tire of an endless belting independently fabricated and of a width adapted irrespective of lateral movements of the tire over the head of the rail to cover always the entire tread contact of the tire. In other words, the width is greater than the rail head by an amount sufficient to allow for this lateral movement. This belting is preferably of fibrous material, as for example, cotton coarsely and heavily knitted or woven (I regard knitting and weaving as equivalents) and endless, that is to say, the weaving and knitting of the belt results in continuity of its circular form or equivalently any joint in it is possessed of reliability and durability substantially like that of its main body. The belt instead of being constructed of fibrous materials may be constructed of metallic filamentary material, as for example, metallic cordage or wire of various and sundry description.

This belt I may vulcanize in place in a bed of tread rubber which may engage it upon either its inner periphery or outer periphery or both. Alternatively I may set the belt assembly in place so that upon wear it may be removed and another placed thereon in its stead.

Such a belt partakes freely of the distortion of the tread surface of the tire incident to its loading and driving relations, reinforces the casing of the tire to withstand its interior pressures, protects it against puncture throughout the width of the belt, improves the traction under certain conditions, and above all, takes the wear and markedly improves the life of the tire.

In the drawing—

Figure 4:
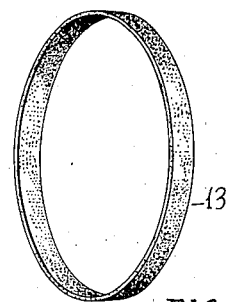
Figure 5:
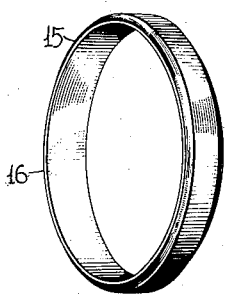
Figure 6:
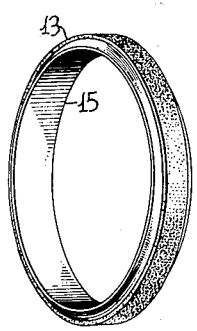

Figure 4 is a perspective on a small scale showing the endless character of the belt, and Figure 5 is a similar perspective for a modification showing the endless character of a rubber bed in which the tread may be separately mounted; while Figure 6 is a similar view of yet another modification showing the tread and rubber in a single endless unit adapted to be vulcanized to the tire or retained in place in suitable grooves in its unremovable tread portion.

Figure 2:
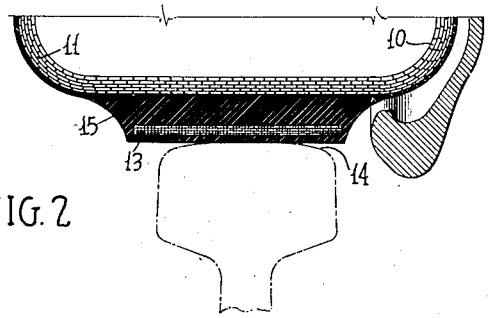
Figure 2 is a similar cross section showing the endless belt enveloped in the rubber of the tread of the tire and so long as the tire is new at least engaging the head of the rail through that rubber which is vulcanized to its exterior surface.

Referring to the drawing 10 is the casing of the tire. It is provided with suitable fabric reinforcements 11 themselves adapted to retain the required pressures within the tire under load, with or without the application of the endless belt, the central feature of my invention. If desired, however, the strength of the canvas cordage or other reinforcement 11 of the casing of the tire may be reduced in proportion to the assistance afforded by the endless belt applied to the tread so that the two together afford the strength requisite to retain the operating pressures of the tire. In such case the factor of safety is adjusted to permit a certain percentage of wear upon the endless belt as applied to the tread or else the endless belt as shown in Fig. 2 is embodied in rubber and the belt so embodied or the tire itself replaced when the wear has reached the belt itself. See Fig. 6.

13 is the endless belt of fibrous material or of filamented metallic material. It is of the endless form shown in Figs. 4 and 6 either woven or knitted, or else provided with the joints equivalent in physical character to its main body of material whereby all the responses to tread engagement are uniform throughout the periphery of the tire. This belt is of a width greater than the width of the rail head so that when the vehicle shifts laterally as respects the rail head to the extent permitted by the wheel flanges, the belt covers the entire width of the rail head.

Figure 1:
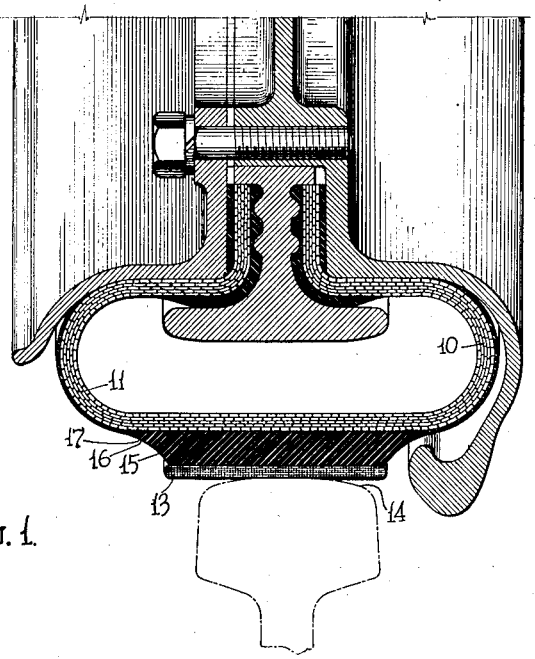
Figure 1 is a cross section of the pneumatic rail car tire of my invention showing the endless belt as vulcanized to the tread portion of the casing by its interior surface and its exterior surface engaging the head of the rail directly.

In the form of Fig. 1, this belt 13 directly engages the rail head 14, its exterior surface leaving its fibrous or filamented material exposed. Its interior surface is vulcanized to the casing 10 through the intermediary of an endless ring of rubber belting 15.

So organized, the rubber belting 15 being vulcanized both to the woven or knitted belting 13 and to the casing 10, and the reinforcement 11 of the casing being itself adequate to stand the interior pressures, the tire may be run until the woven exterior tread belting 13 is entirely worn away whereupon operation may continue for a time upon the rubber portion 15 of the tread. A belting 13 of proper weave or knit will last a very much longer time than the rubber 15. This is so because it much more effectually resists abrasion and cutting than does the tread of rubber only. A new tread 13 may at any time be vulcanized on in place of that which is worn away.

Instead of being applied in the separated endless belt form shown in Fig. 4, the application of the belt 13 may be in the form combined with the belt 15 as shown in Fig. 6. In this form the two belts are initially vulcanized to each other. So organized into a unit, they may be applied to the tire 10 as a unit being vulcanized thereto to take the form shown in Fig. 1.

Instead of being vulcanized in place either of the belts may be appropriately fitted to the tread portion of the tire 10 without inter-surface vulcanization, dependence being had upon the pressure within the tire itself. The application of the belts is made while the tire is deflated. Shoulders 16 and 17 respectively upon the belt 15 and upon the casing 10 constitute means for laterally locating the parts with respect to each other. Indeed, they afford seats resisting their lateral displacement. And then when the pressure within the tire is raised to the proper value, the treads are retained against both lateral and annular creepage by the very high co-efficients of friction which obtain between elements of such material under high pressure. A soapstone powder or other material insuring easy separation in case of need for replacement, may be sprinkled upon the inter-engaging surfaces at the time of assembly.

Figure 3:
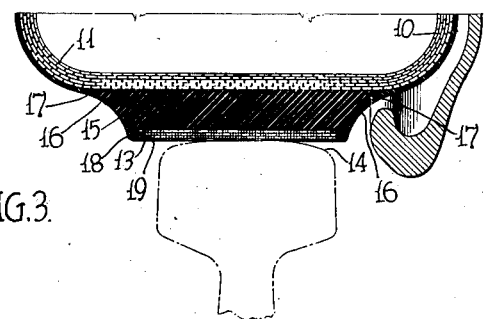
Figure 3 is a similar cross section showing the endless belt as engaged in a groove in the rubber of the tread of the tire and therethrough removable.

A special adaptation of this means of securement through non-vulcanized connections, and initial and subsequent alignment through specially provided seatings, is shown in Fig. 3 where these seatings are given such form. In this form both the endless rubber belt 15 and the endless fabric belt 13 are non-vulcanized in place and freely removable on deflation of the tire. The rubber belt 15 is seated in place by shoulders 16 and 17 as in the forms of Figs. 1 and 2. The endless fabric belt 13 is seated between shoulders 18 on the belt 15 and the edges 19 of the fabric belt itself.

If the removable and replaceable belts are desired to facilitate renewal and repair in case of wear without the necessity for stripping, adherence to the casing 11 or adherence of the belt 13 to the rubber of belt 15 in case the belts are vulcanized or otherwise stamped annularly in place, or to avoid renewing the entire tire, any one of the following modifications may be resorted to. First, the rubber belt or layer 15 may be permanently vulcanized to the casing 11 and the fabric belt 13 be constituted a freely removable and replaceable unit being supplied for replacement and repair in the form shown in Fig. 4. Second, the rubber 15 may be supplied permanently vulcanized to the fabric belt 13 in the form shown in Fig. 6 and the rubber and fabric units 13 and 15 supplied in such unit construction for replacement and repair. In such case it will be removably and replaceably seated by shoulders 16 and 17 in any one of the forms of invention shown in Figs. 1, 2 and 3. This is to show that the removable and replaceable unit illustrated in Fig. 6 may be of the cross section of elements 13 and 15 as shown in Fig. 1, or of a cross section shown in Fig. 2, or of a cross section shown in Fig. 3. Third the belts 13 and 15 may be independently supplied as removable and replaceable units respectively in the form shown in Figs. 4 and 5. In this case, the combined cross sections may be either as shown in Fig. 1 or as shown in Fig. 3. As shown in Fig. 1, there are no shoulders to retain the belt 13 in place whereas in Fig. 3 there are provided the shoulders 18—19.

The belt 13 as has been said, can be made of either organic material or filamented metallic material. In a preferred form I utilize both of these materials. I have devised a new carcass material for pneumatic tires the principal advantage of which is the cutting down of the heat generated through the bending of metallic material in the distortion of the tire, furthermore, cutting it down to such point that the organic material within its reach may not be damaged. Specifically, I propose to utilize a cordage, tape or belting the longitudinal annularly extending fibers of which are metallic, the wire and the transverse or other interlocking elements of which are of organic material, as for example, cotton or preferably rayon. According to my invention, I utilize a metallic filament of such extremely fine diameter that it may be distorted due to the use of the tire over long periods of time under extreme conditions of load and heat without the generation of heat of a degree which will damage the organic constituent such as the rayon within its reach. In other words, the bending moment of the wire under distortion in use is so extremely small that the aggregate B. t. u. generated is too small and too lacking of concentration to burn, char or otherwise damage the cotton or rayon in contact therewith.

It is my proposal to construct the cordage or tape of carcasses of pneumatic tires of this material but specifically in connection with this invention I propose to construct the belt 13 of this material, utilizing the annularly extending metallic filaments of such extremely fine diameter to take the major strains and the cotton or rayon, preferably rayon, transverse filaments to bind the longitudinally extending filaments together and to take the minor strains.

Irrespective of the circumstantial terminology utilization which is occasioned by the limitations in my present knowledge of the extent to which the utilization of my invention is capable, it is intended that the annexed claims shall have imparted to them in full in all interpretations the generic spirit of my invention as reflected from the prior art.

What I claim is:—

1. A rail car tire having a main body distortable at the tread, and an endless belting of a width greater than the width of the rail head on which the tire is to travel applied as a unit to the tread and partaking of the distortion thereof, said belting being comprised of woven fabric including continuous annularly extending fine strands of wire of high tensile strength.

2. A pneumatic rail car tire comprising a fabric reinforced casing and a replaceable endless belt of rubber reinforced against expansion and wear by an annularly continuous fabric and constituting the main tread wall of the tire, the cross section of the belt comprehending an inner base of non-reinforced rubber relatively wider and thicker than the fabric reinforcement and thicker than the walls of the tire.

3. A pneumatic rail car tire having a separately fabricated reinforcing endless belting comprising interwoven fine metallic strands extending annularly and rayon fibre extending transversely and holding the metallic strands in transversely spaced relation.

4. A pneumatic rail car tire having inner and outer beltings mounted thereon of a width greater than the rail head on which the tire is to travel, the inner one constituted of rubber and the outer of fabric, which beltings are removable and replaceable both with respect to the tire and with respect to each other.

EDWARD G. BUDD.